（12） United States Patent
Choube et al.

(10) Patent No.: US 8,849,763 B1
(45) Date of Patent: Sep. 30, 2014

(54) USING MULTIPLE CLIENTS FOR DATA BACKUP

(75) Inventors: Mehul R. Choube, Maharashtra (IN); Gaurav Malhotra, West Bengal (IN); Shyam Prakash Velupula, Andhra Pradesh (IN); Nitin Suresh Supekar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 188 days.

(21) Appl. No.: 13/408,600

(22) Filed: Feb. 29, 2012

Related U.S. Application Data

(63) Continuation of application No. 13/396,809, filed on Feb. 15, 2012, now Pat. No. 8,738,581.

(51) Int. Cl.
 *G06F 17/00* (2006.01)
(52) U.S. Cl.
 USPC ............ 707/646; 707/610; 707/640; 711/161
(58) Field of Classification Search
 None
 See application file for complete search history.

(56) References Cited

U.S. PATENT DOCUMENTS

| | | | | |
|---|---|---|---|---|
| 7,657,581 | B2 * | 2/2010 | Orenstein et al. | 707/661 |
| 8,229,893 | B2 * | 7/2012 | Orenstein et al. | 707/646 |
| 8,341,130 | B2 * | 12/2012 | Kaplan et al. | 707/694 |
| 8,452,731 | B2 * | 5/2013 | Preslan et al. | 707/652 |
| 8,515,915 | B2 * | 8/2013 | Bryant et al. | 707/652 |
| 8,706,697 | B2 * | 4/2014 | Morsi et al. | 707/661 |
| 2005/0091248 | A1 * | 4/2005 | Pitts | 707/100 |
| 2006/0053157 | A1 * | 3/2006 | Pitts | 707/102 |
| 2009/0210431 | A1 * | 8/2009 | Marinkovic et al. | 707/10 |
| 2010/0106691 | A1 * | 4/2010 | Preslan et al. | 707/674 |
| 2010/0191779 | A1 * | 7/2010 | Hinrichs | 707/822 |
| 2011/0106802 | A1 * | 5/2011 | Pinkney et al. | 707/737 |
| 2011/0231524 | A1 * | 9/2011 | Lin et al. | 709/220 |
| 2011/0238814 | A1 * | 9/2011 | Pitts | 709/223 |
| 2012/0078850 | A1 * | 3/2012 | Bryant et al. | 707/652 |
| 2012/0158669 | A1 * | 6/2012 | Morsi et al. | 707/689 |
| 2012/0254257 | A1 * | 10/2012 | Mitra et al. | 707/803 |
| 2013/0036088 | A1 * | 2/2013 | Orenstein et al. | 707/610 |
| 2013/0246366 | A1 * | 9/2013 | Preslan et al. | 707/652 |
| 2014/0006465 | A1 * | 1/2014 | Davis et al. | 707/827 |

OTHER PUBLICATIONS

Leung et al, "Scalable Full-Text Search for Petascale File Systems", 2008.*

* cited by examiner

*Primary Examiner* — Hung Le
(74) *Attorney, Agent, or Firm* — Campbell Stephenson LLP

(57) ABSTRACT

Various systems and methods for using multiple clients for data backup are described. For example, one method involves accessing a namespace, where the namespace indicates locations of files. At least a portion of the namespace is divided into sets, where the sets correspond to a subset of the files. The files of the subset are accessed by plurality of nodes, and the accessing is based on the sets. Each of the nodes accesses the files of the subset. The nodes are used to store, at data storage, the files of the subset.

20 Claims, 12 Drawing Sheets

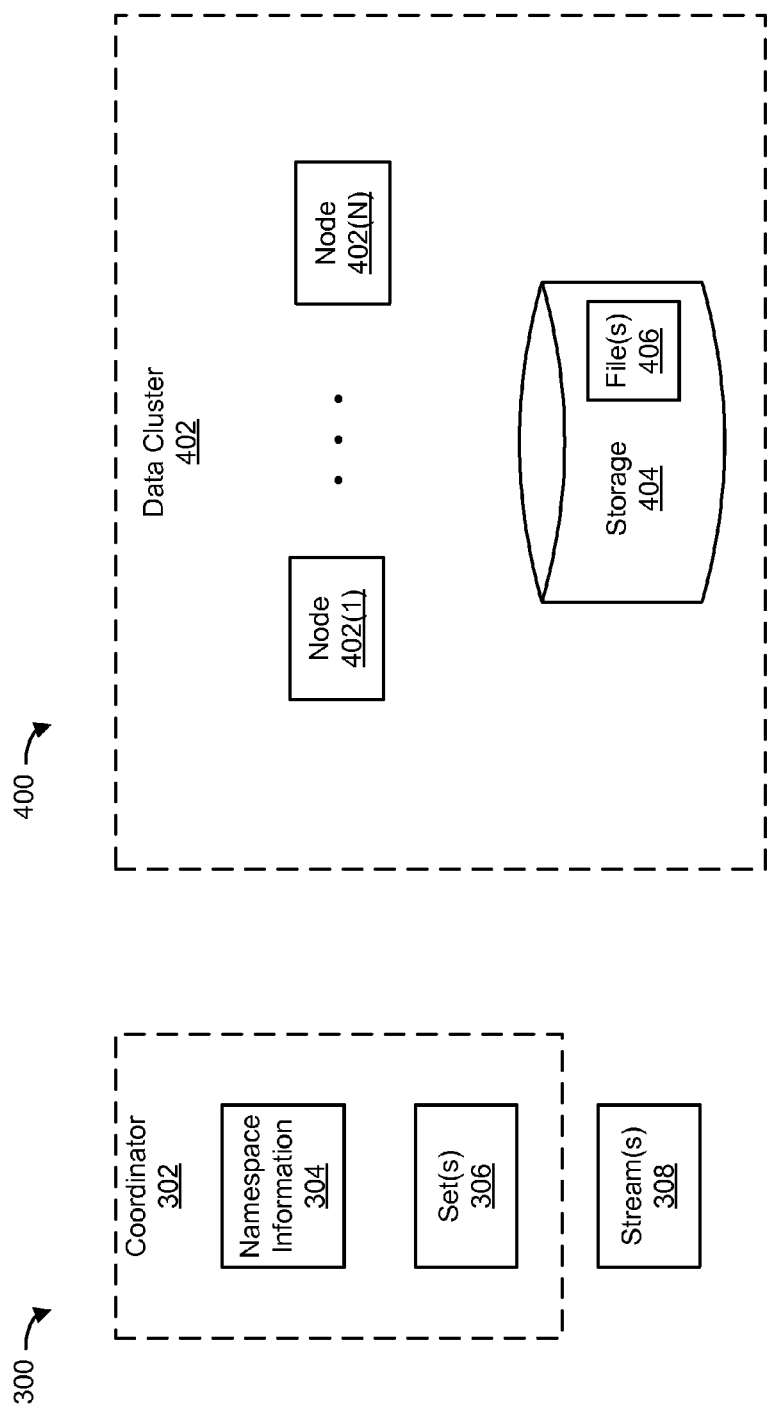

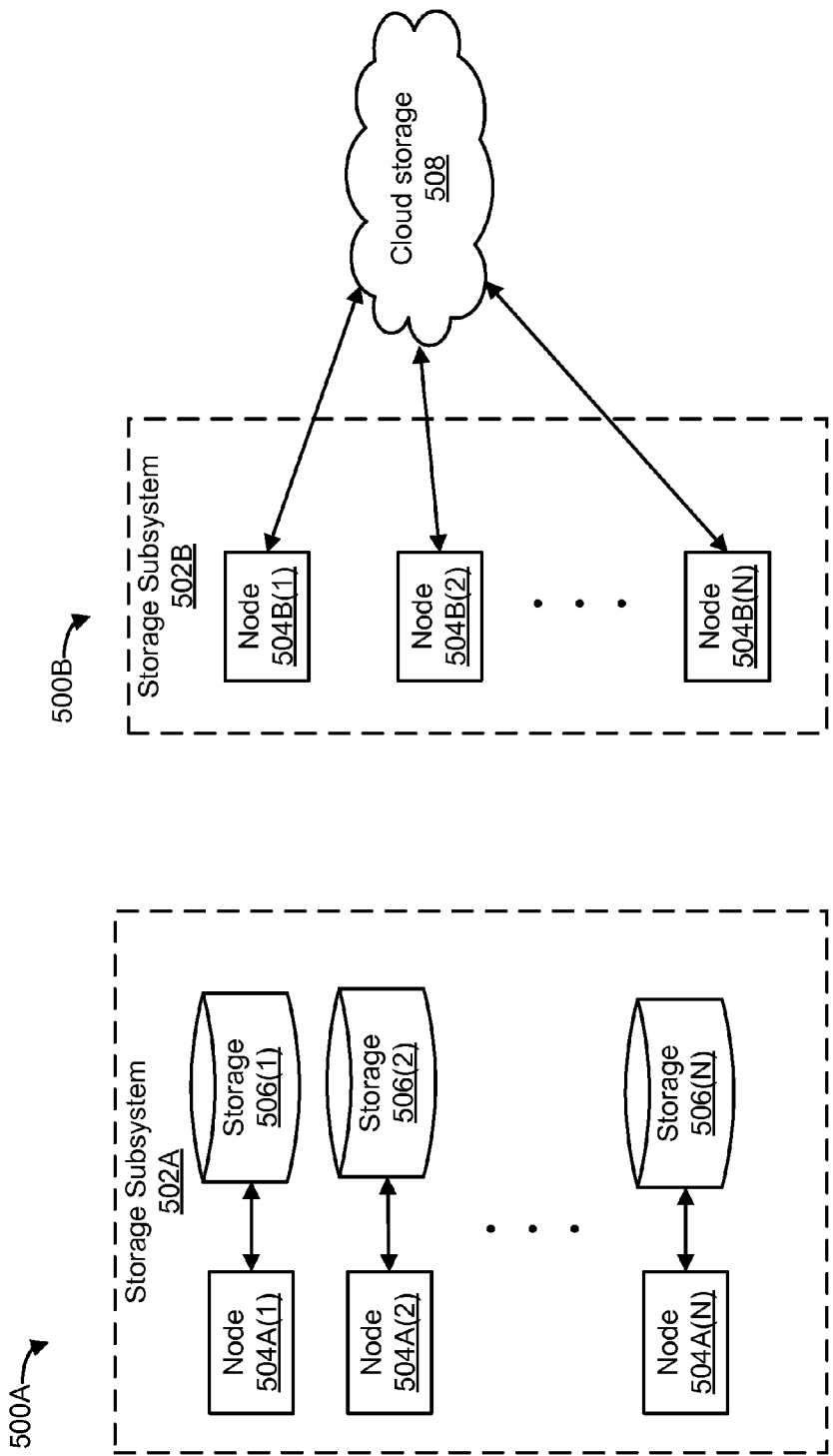

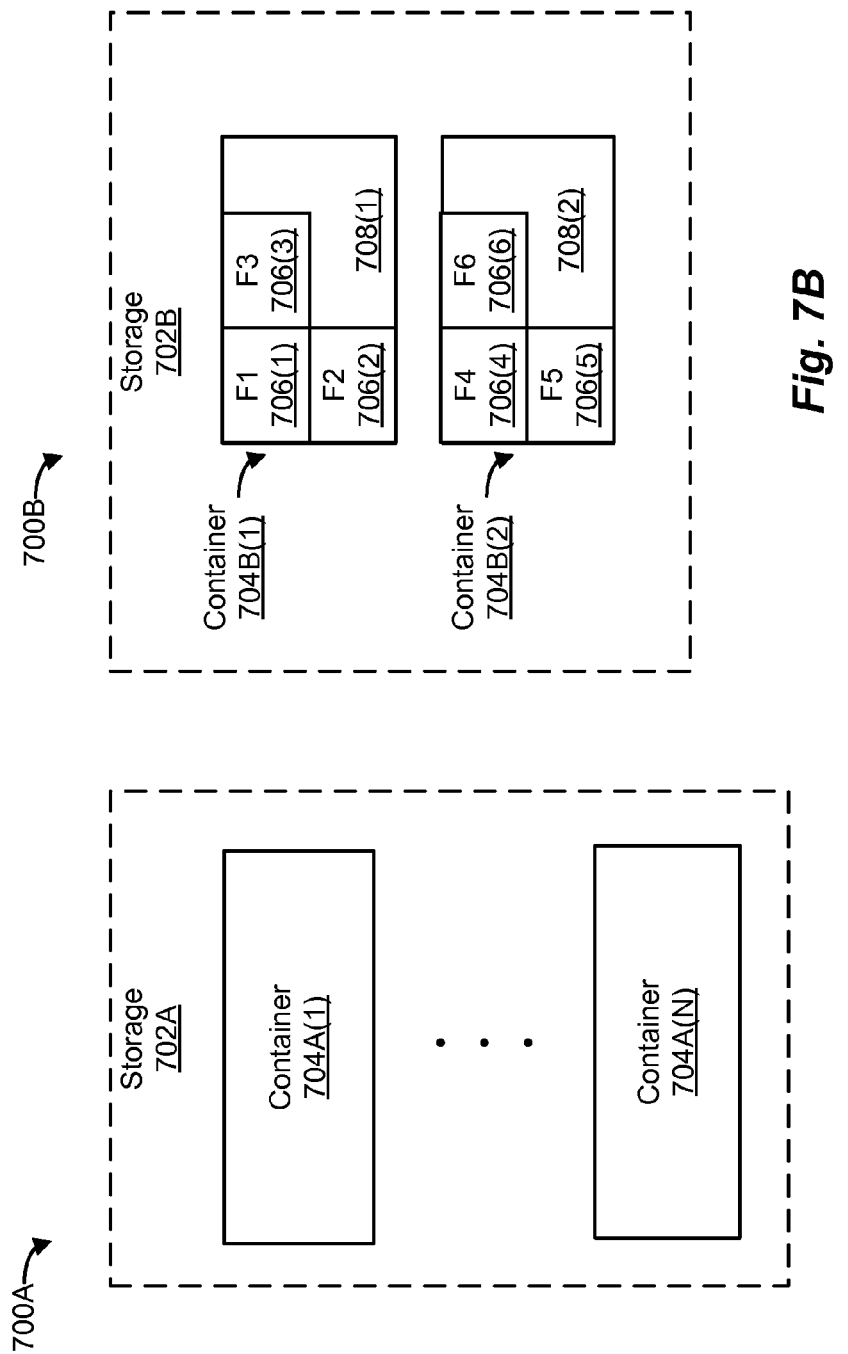

USING MULTIPLE CLIENTS FOR DATA BACKUP

CROSS-REFERENCE TO RELATED APPLICATIONS

The present patent application is a continuation of U.S. patent application Ser. No. 13/396,809, filed on Feb. 15, 2012, now U.S. Pat. No. 8,738,581 entitled "Using Multiple Clients for Data Backup" and is incorporated by reference herein in its entirety and for all purposes.

BACKGROUND OF THE INVENTION

1. Field of the Invention

This application relates to data backup. Particularly, this application relates to managing data backup in a distributed environment.

2. Description of the Related Art

Companies today extensively rely on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Data backup can be used to prevent data loss in case of any such disaster. A data backup process typically creates copies of original data. These copies can be used to restore the original data after a data loss event. The backed-up data can be stored using a variety of media, such as magnetic tape, hard drives, and/or optical storage, among others. Various techniques can be used to optimize such backups, such as to improve backup speed, restore speed, data security, media usage and/or reduce bandwidth requirements.

BRIEF DESCRIPTION OF THE DRAWINGS

The embodiments of the present application may be better understood, and its numerous objects, features, and advantages made apparent to those skilled in the art by referencing the accompanying drawings.

FIG. 3 is a block diagram of a coordinator node, according to one embodiment.

FIG. 4 is a block diagram of a data cluster, according to one embodiment.

FIGS. 5A and 5B are block diagrams of storage subsystems, according to some embodiments.

FIGS. 7A and 7B are block diagrams of data storage, according to one embodiment.

Figure 1:
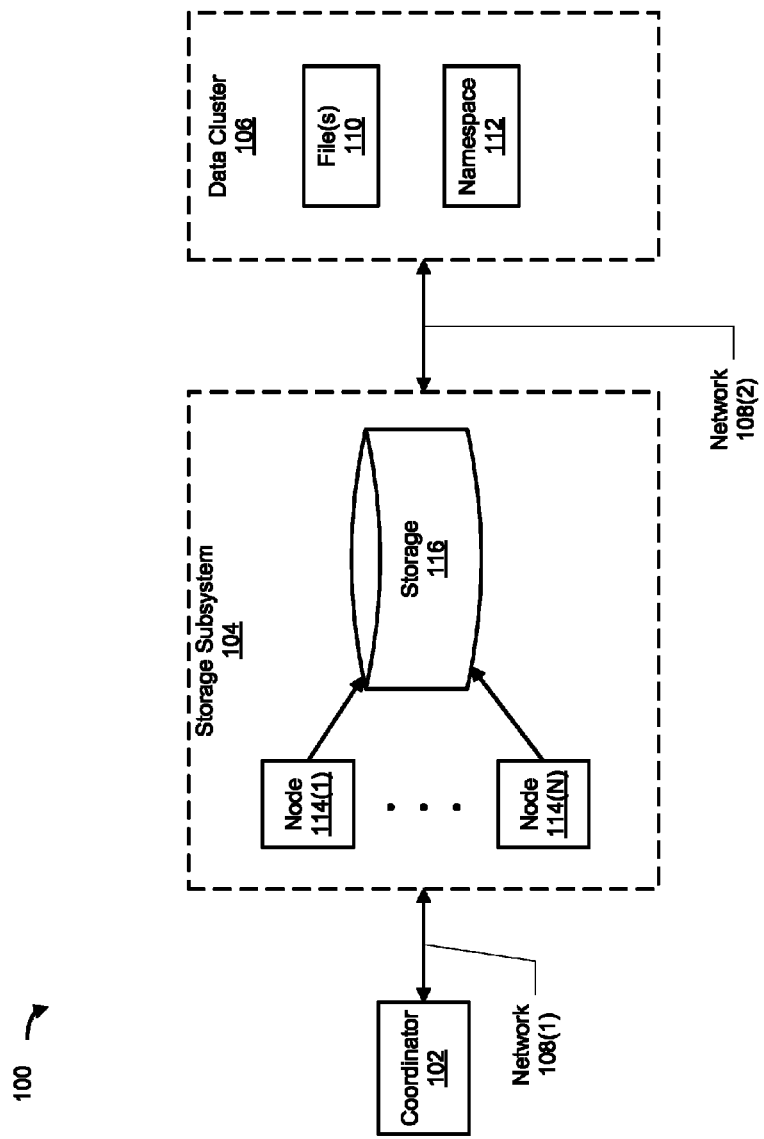
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Modern distributed storage environments may include multiple storage objects connected via one or more interconnection networks. The interconnection networks provide the infrastructure to connect the various elements of a distributed shared storage environment. Storage systems frequently use data redundancy mechanisms to ensure data integrity, consistency, and availability. Other uses for data redundancy may include backing up data, distributed load sharing, disaster recovery, or point-in-time analysis and reporting. One approach to data redundancy is to back up data from a primary storage system to a second storage system.

FIG. 1 is a block diagram illustrating a distributed system 100 that includes a collection of nodes and storage. Distributed system 100 includes several nodes and/or subsystems, e.g., a coordinator node 102, a storage subsystem 104, and a data cluster 106. Each of coordinator node 102, storage subsystem 104, and data cluster 106 can communicate with each other using a network, e.g., network 108A/B. Network 108A/B can include a local area network (LAN), a wide area network (WAN), a storage area network (SAN), Ethernet, and/or any combination thereof. It is noted that distributed system 100 may include a different number of elements. Data cluster 106 includes a namespace 112 that indicates locations of a plurality of files 110. Storage subsystem 104 includes one or more node(s) 114(1)-114(N). Each node 114(1)-114(N) can access data storage 116. Data storage 116 is shown as an element of storage subsystem 104 for explanation purposes only, as data storage 116 can include one or more distributed storage devices and/or external cloud storage, among others.

In one embodiment, coordinator node 102 accesses (e.g., over network 108(1) and/or 108(2)) namespace 112 of data cluster 106. In one implementation, namespace 112 can be a directory that identifies files 110, such as file name, directory, location, etc. In one implementation, coordinator node 102 operates on namespace 112 of data cluster 106. In another implementation, coordinator node 102 can copy some, or all, of namespace 112 to a local storage, e.g., local storage associated with coordinator node 102, and then operate on the namespace copy. In either (or related) implementation, coordinator node 102 divides at least a portion of the namespace into multiple sets, such that each set corresponds to a subset of files 110. For example, the namespace can be divided into three separate sets, each set containing a separate portion of the namespace that corresponds to three unique sets of files.

Next, nodes 114(1)-114(N) access the subset of files using the multiple sets. In one implementation, coordinator node 102 communicates data containing the multiple sets to nodes 114(1)-114(N), such as over network 108(1). Each of nodes 114(1)-114(N) accesses the subset of files 110 in data cluster 106, such as over network 108(2). In one implementation, each node 114(1)-114(N) can access a group of files corresponding to one namespace set of the multiple sets. In one implementation, coordinator node 102 also creates multiple streams, where each stream can correspond to one or more sets. In this implementation, nodes 114(1)-114(N) can access a group of files corresponding to a stream (e.g., one or more sets). In either (or related) implementation, nodes 114(1)-114(N) store the accessed files at storage 116. In one implementation, each node 114(1)-114(N) can access some group of files from files 110 (e.g., using a certain stream) and then store that group of files at storage 116. This method of using multiple clients for data backup can thus access and store files in parallel.

Figure 2:
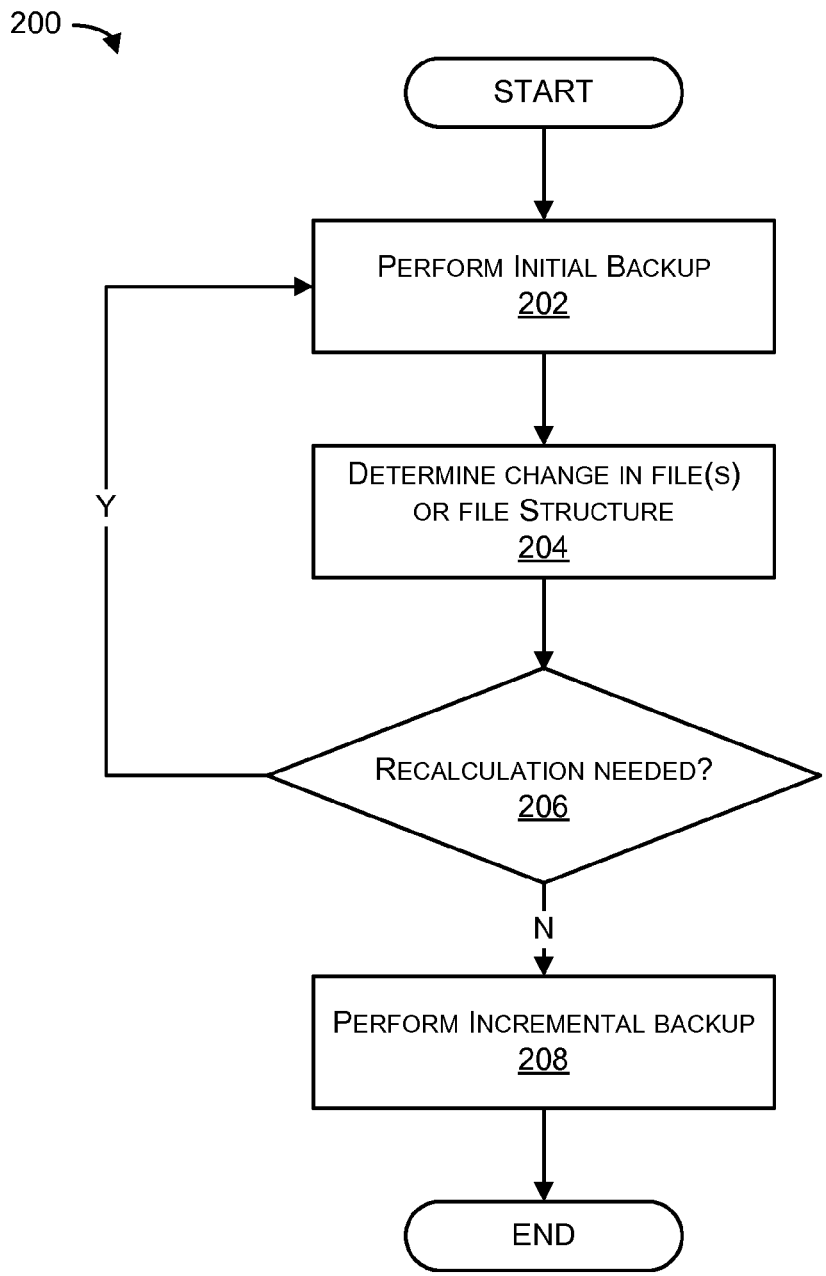
FIG. 2 is a flowchart illustrating a method for using multiple clients for data backup, according to one or more embodiments.

FIG. 2 is a flowchart illustrating a method 200 for using multiple clients for data backup, according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1.

In element 202, an initial backup is performed. For example, coordinator node 102 can initiate an initial backup of files 110 of data cluster 106. As described above, coordinator node 102 can access namespace 112, divide a portion of name space 112 into sets. A subset of files 110 that corresponds to the sets can be accessed by nodes 114(1)-114(N) and then be stored in storage 116. In one embodiment, the initial back-up can be performed using method 600A of FIG. 6A. However, in other embodiments, the initial back-up can be performed using other methods, such as ones that use one client and/or non-dynamic stream generation (e.g., as shown in FIG. 6B).

In element 204, it is determined whether there is a change in file(s) 110 or file structure of files 110. In one embodiment, coordinator node 102 and/or a node in data cluster 106 can monitor file(s) 110 and/or file structure of files 110, and make this determination. In another implementation, one or more agents on any nodes in system 100 can monitor file(s) 110 and/or file structure of files 110 and make this determination. Data cluster 106 can also send notification(s) to coordinator node 102 indicating such a change.

In element 206, coordinator node 102 determines whether a recalculation is needed for this change to file(s) 110 or file structure of files 110, e.g., a recalculation of the sets. If coordinator node 102 determines that this change requires a recalculation, method performs element 202. In one embodiment, coordinator node 102 performs the recalculation, e.g., divide, a portion of namespace into a sets. It is noted that when performing the recalculation, coordinator node 102 can calculate sets that are different from sets initially calculated. The recalculation can account for added and/or deleted files, or a change in file structure that affects the way these files are backed-up. If coordinator node 102 determines that this change does not require a recalculation, method performs element 208.

In element 208, coordinator node performs an incremental backup using existing sets, i.e., without performing the recalculation. In one embodiment, the incremental backup of element 208 relates to using the same number of sets (e.g., as divided by the coordinator node) for performing the back-up. Similarly, the initial backup of element 202 relates to recalculating the sets (e.g., as divided by the coordinator node). In one embodiment, the incremental back-up can be performed using portions of method 600A of FIG. 6A (such as element 630). However, in other embodiments, the incremental back-up can be performed using other methods, such as ones that use one client and/or non-dynamic stream generation (e.g., as shown in FIG. 6B, e.g., element 662).

FIG. 3 is a block diagram 300 of a coordinator node 302, such as node 102 described in FIG. 1. It is noted that block diagram 300 illustrates elements that are used by coordinator node 302, and that FIG. 11, among others, illustrates additional aspects of the coordinator node. Coordinator node 302 can include namespace information 304 and set(s) 306, and it generates and/or coordinates use of stream(s) 308. It is noted that in some embodiments, one or more of elements of coordinator node 302 may not be used.

In one embodiment, namespace information 304 can be a copy of at least a portion of namespace (e.g., namespace 112) of the data cluster (e.g., data cluster 106). For example, namespace information 304 can be a copy of the portion of namespace that is accessed by the coordinator node. Coordinator node 302 can divide namespace information 304 into set(s) 306. However, it is noted that in one embodiment, coordinator node 302 can access and divide the namespace of the data cluster directly, i.e., without using namespace information 304. In one embodiment, coordinator node 302 also uses metadata received from the data cluster when performing the dividing. In one embodiment, coordinator node 302 can generate one or more stream(s) using sets 306. Coordinator node 302 can communicate streams 308 to the storage subsystem (i.e., nodes of the storage subsystem). Coordinator node 302 also can coordinate nodes' use of streams, as described herein. Coordinator node 302 also can use information received from the storage subsystem when performing the dividing and/or when generating the streams.

FIG. 4 is a block diagram 400 of a data cluster 402, such as data cluster 106 described in FIG. 1. Data cluster 402 can include one or more node(s) 402(1)-402(N) and storage 404. It is noted that in some embodiments, one or more of elements of data cluster 402 may not be used. In one embodiment, data cluster 402 can be implemented using a distributed file system, such as a HADOOP Distributed File System (HDFS). Nodes(s) 402(1)-402(N) can manage storing of data, such as files 406 (e.g., implementation of files 110), to storage 404. Nodes(s) 402(1)-402(N) can communicate with each other over a network (not shown). Each of nodes(s) 402(1)-402(N) can serve data from storage 404 to other nodes, such as to the coordinator node. In one embodiment, one of nodes(s) 402(1)-402(N) can implement a server node that coordinates communication among nodes(s) 402(1)-402(N). This server node can also create and manage namespace (e.g., namespace 112) for files 406.

In one embodiment, one or more of nodes(s) 402(1)-402(N) can also monitor storage 404 for changes to data and/or file structure of files 406. In one embodiment, one or more of nodes(s) 402(1)-402(N) can also monitor storage 404 for changes to data and/or file structure of files 406. One or more of nodes(s) 402(1)-402(N) can send a notification to the coordinator node indicating a change to files 406 and/or change in file structure of files 406. In one embodiment, one or more of nodes(s) 402(1)-402(N) can monitor the file structure of files 406 prior to any backup operation that can be initiated by the coordinator node. For example, one or more of nodes(s) 402(1)-402(N) can continuously monitor the file structure of files 406 and thus maintain an updated namespace for files 406. One or more of nodes(s) 402(1)-402(N) can also generate and maintain metadata, in addition to the namespace, for files 406. This metadata can include additional information about files 406, such as size, last update time, frequency of update, client(s) that access a certain file, etc. This additional metadata can be communicated with the coordinator node along with the namespace.

FIGS. 5A and 5B are block diagrams 500A and 500B of the storage subsystem, according to one embodiment. It is noted that in some embodiments, one or more of elements of coordinator node storage subsystem may not be used. Also, it is noted that the embodiments shown in 500A and 500B can be combined, e.g., the nodes can access and store data in storage device(s) as well as using cloud storage. In one embodiment, nodes 504A(1)-504A(N) and nodes 504B(1)-504B(N) can be substantially similar to each other.

Storage subsystem 502A includes nodes 504A(1)-504A(N) and storage devices 506(1)-506(N). It is noted that although FIG. 5A shows a one-to-one correspondence between a node and a storage device, this is shown for illustrative purposes only, and other combinations are contemplated, such as each node being associated with multiple storage devices, and/or each storage device being associated with multiple nodes. Nodes 504A(1)-504A(N) can communicate with the coordinator node and the data cluster. Nodes 504A(1)-504A(N) can send status information to the coordinator node indicating availability of each of nodes 504A(1)-504A(N), such as node's (and/or storage device's) availability to store data from the data cluster to storage 506(1)-506(N). For example, nodes 504A(1)-504A(N) can communicate with other nodes and/or systems other than the coordinator node and the data cluster, and as such, can be busy performing other functions.

Storage subsystem 502B includes nodes 504B(1)-504B(N) and can connect to cloud storage 508. Cloud storage 508 can be implemented using network online storage, and allow nodes 504B to store data. Cloud storage 508 can be implemented using one or more servers (not shown) that give nodes 504B(1)-504B(N) access to virtualized pools of storage to store data. Nodes 504B(1)-504B(N) communicate with the coordinator node and the data cluster. Nodes 504B(1)-504B(N) can send status information to the coordinator node indicating availability of each of nodes 504B(1)-504B(N), such as availability to store data from the data cluster to storage 506(1)-506(N). Nodes 504B(1)-504B(N) can communicate with other nodes and/or systems other than the coordinator node and the data cluster, and thus may be busy performing other functions.

Figure 6A:
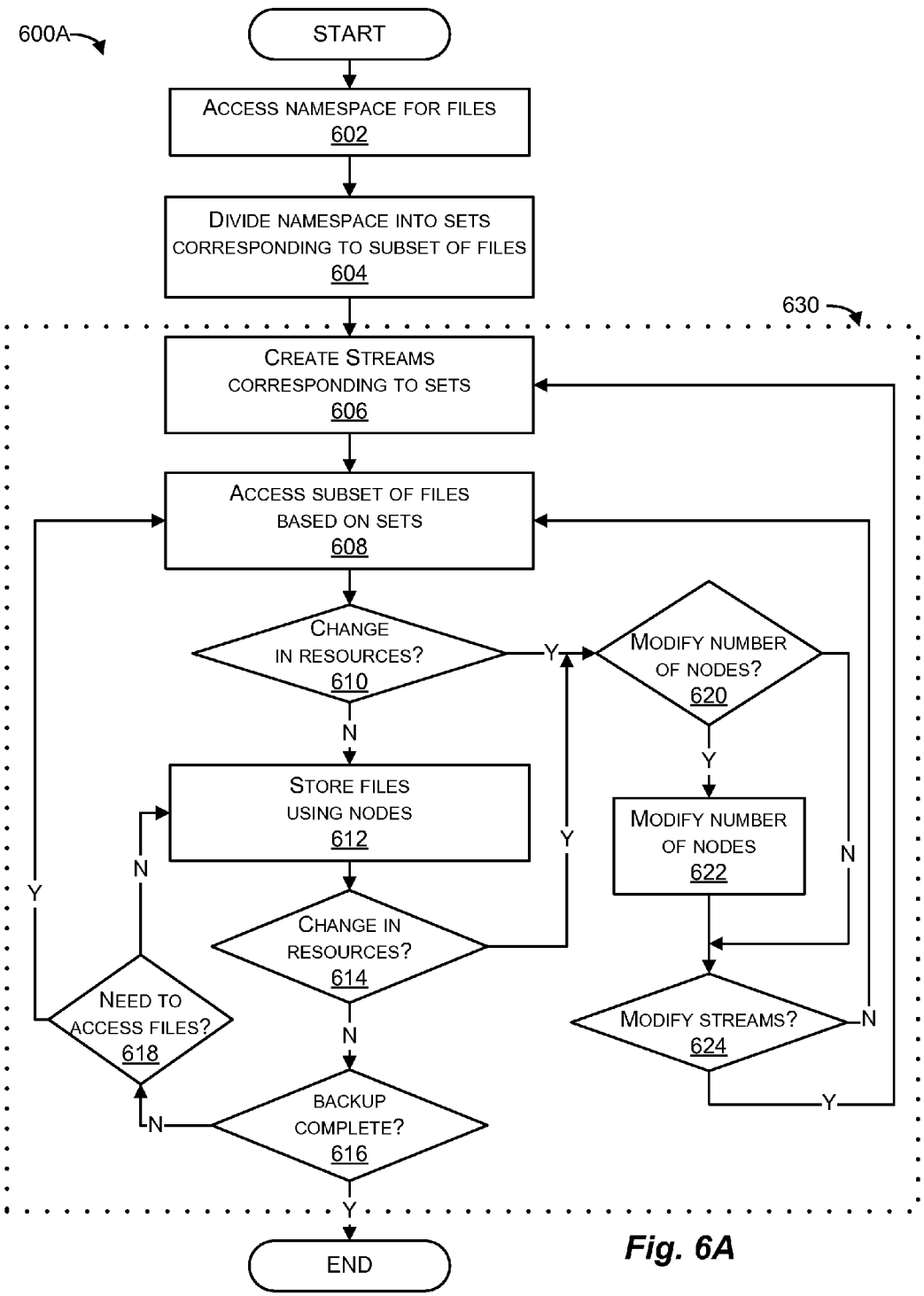
FIGS. 6A and 6B are flowcharts illustrating methods for data backup, according to one embodiment.
Figure 6B:
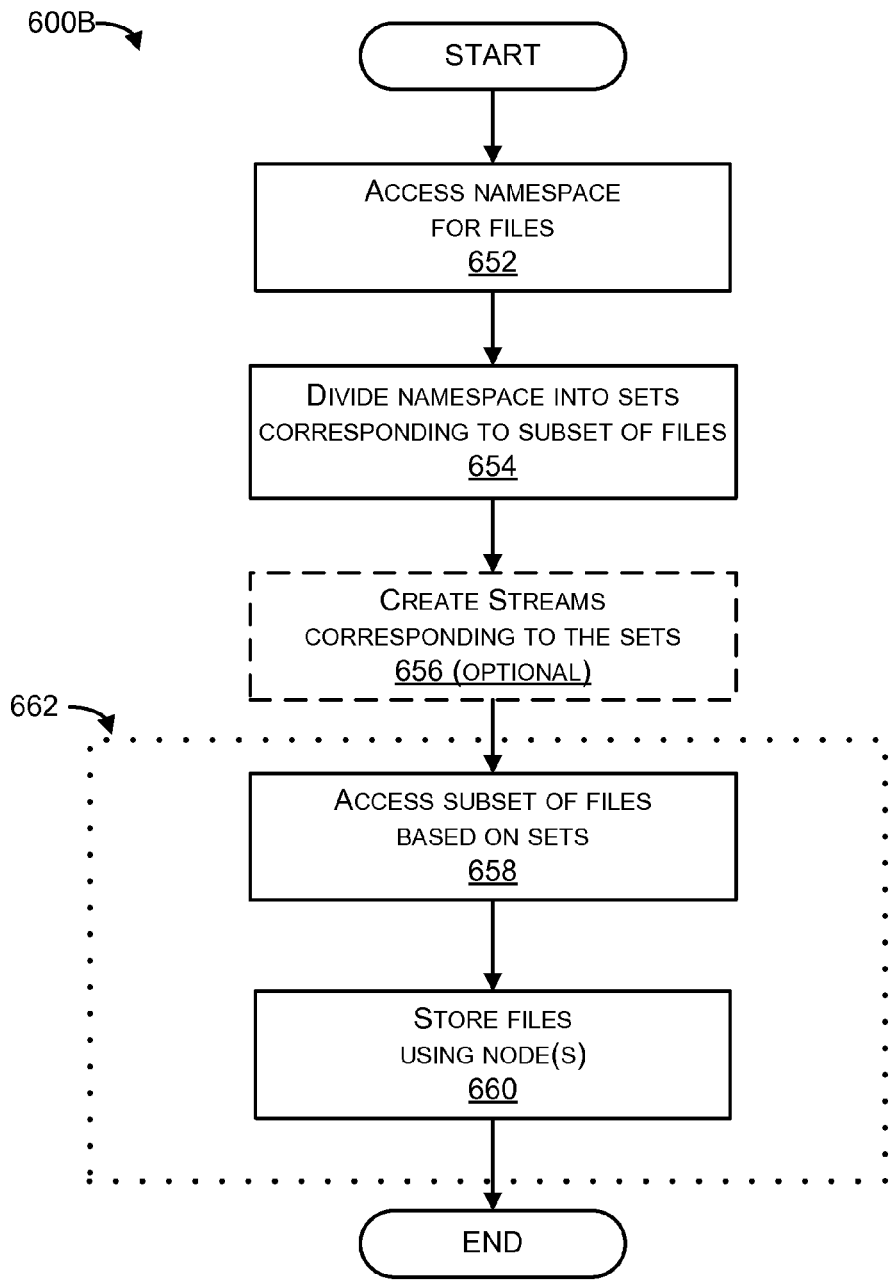

FIG. 6A is a flowchart illustrating a method 600A for using multiple clients for data backup, according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 600A is described with reference to variations of the elements described in connection with FIG. 1. In one embodiment, substantially all of elements 602-624 can be performed by the coordinator node for an initial backup. In one embodiment, the operation of element 630 can be performed by the coordinator node for an incremental backup.

In element 602, a coordinator node accesses a namespace for files. For example, coordinator node 102 can access namespace 112 for files 110. As noted, coordinator node can use namespace information that is a local copy of namespace 112 and that corresponds to at portion of namespace 112. The namespace information (e.g., element 304) can include a copy of namespace 112 as well as additional information about namespace 112.

In element 604, the coordinator node divides the namespace into multiple sets. For example, coordinator node 102 can divide the namespace (or the local namespace information) into multiple sets. The coordinator node can perform the dividing based on file attributes of the files of the subset, for example. Such file attributes can include locality of the files of the subset, e.g., where the files are (or can be) stored in the data cluster. In one embodiment, the locality of the files can also include location of the files as they are stored in the data storage (of the storage subsystem). Various methods of dividing a namespace are described below.

In element 606, the coordinator node can create multiple streams corresponding to the sets. In one embodiment, the coordinator node can communicate with the storage subsystem to make a determination as to the number of streams that are to be created. For example, the number of streams that are created can depend on the type and speed of data storage, the number of nodes available in the storage subsystem to service these streams, connection speed between the nodes and the data storage and/or data cluster, local (e.g., cache memory) storage on each node in the storage subsystem, and/or number of other tasks that are performed by the nodes in the storage subsystem, among other such factors. Thus, the number of streams created by the coordinator node is typically dependent on the resources available, and it can be dynamically adjusted, such as by recalculating the number of streams that can be used based on changes in the available resources. In other words, the coordinator node can dynamically scale (e.g., increase or decrease) the number of streams depending on the available resources.

In element 608, a group of files of the subset of files in the data cluster is accessed using the nodes of the storage subsystem. In one embodiment, the nodes can access the first group of files of the subset using the streams. For example, if the storage subsystem has many resources available for backup, the coordinator node can communicate with the nodes (e.g., such as by directing the nodes) to access data for a first group of the files (i.e., corresponding to a first group of sets).

In element 610, the coordinator node determines if there is a change in resources, such as resources of the storage subsystem. The change in resources can include the number of nodes available, change in attributes of the nodes and/or the data storage, among others. If there are no changes in the resources, method 600A continues to element 612. If there are changes in the resources, method 600A continues to element 620.

In element 612, a group of files are stored by the nodes. The nodes can store the first group of files that are accessed in element 608. For example, if there are three nodes available for accessing and storing, the nodes can use 3 different streams, and there are 100 sets of files of the data cluster, then each node can use one stream to access (element 608) and then store (element 612) a single set of files to data storage. In one embodiment, if resources allow, each node can store a single set using multiple streams. For example, if there is enough bandwidth in the storage subsystem, each node can use two (or more) separate streams to store a different portion of a set in parallel. In another embodiment, each node can store separate sets using multiple streams. For example, a first node can store a first set using a first stream and a second set using a second stream.

In element 614, the coordinator node determines if there is a change in resources, such as resources of the storage subsystem. In one embodiment, element 614 is substantially similar to element 610. If there are no changes in the resources, method 600A continues with element 616. If there are changes in the resources, method 600A continues with element 620. In one embodiment, element 614 is performed when at least one of the nodes storing files (of element 612) has completed its storing operation. It is noted that each of the nodes can access and/or store files at different speeds, as the performance of the nodes, network speed and/or latency, a respective data storage speed and/or latency may vary for each node and/or data storage.

In element 616, the coordinator node can determine whether the data backup is complete, i.e., whether the subset of files (of element 604) is saved to the data storage. If the data backup is complete, method 600A ends. If the backup is not complete, method 600A continues with element 618.

In element 618, the coordinator node and/or nodes can determine whether more files of the data cluster should be accessed. Continuing the example, above, if in element 616, the coordinator node determines that the backup is not complete, e.g., there are 98 sets of files that are not yet backed-up, a case where two nodes have completed their storing operation but one has not. In this case, in element 618 it can be determined that the two nodes should access additional files in the data cluster based on the sets. In one embodiment, the nodes can locally store (e.g., in the storage subsystem) a larger group of files than can be stored at one time using the nodes. If more of files of the data cluster should be accessed, method 600A continues with element 608. If no more of files of the data cluster should be accessed at this time, method 600A continues with element 612 (or alternatively, element 610).

In element 620, it is determined whether the number of nodes being used should be modified. Element 620 is performed if method 600A determines that there are changes in the resources. Continuing with the example above, if one of the three nodes fails, or is busy with another task, then the coordinator node can modify the number of nodes being used from three to two nodes. In another example, there may be another node that can be added to the nodes being used for accessing and storing. In yet another example, a single node can use multiple streams to store multiple sets.

In element 622, the number of nodes being used for accessing and storing is modified. Continuing with the example above, the coordinator node can add and/or delete certain nodes of the storage subsystem from being used for the accessing and storing. As can be seen from method 600A, the number of nodes being used is adjusted dynamically during the data backup.

In element 624, it is determined whether the number of streams being used should be modified. Continuing with the example above, the resource change that is detected in element 610 (or 614) can include a change in speed of a network between the nodes and the data storage. For example, the network may become congested. In this case, the number of streams can be modified to reflect the change in resources of the storage subsystem. If the number of streams being used should be modified, method 600A continues with element 606. If the number of streams being used should not be modified, method 600A continues with element 608.

FIG. 6B is a flowchart illustrating another method 600B for using multiple clients for data backup, according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 600B is described with reference to variations of the elements described in connection with FIG. 1. In one embodiment, substantially all of elements 652-660 can be performed by the coordinator node for an initial backup. In that or another embodiment, element 662 can be performed by the coordinator node for an incremental backup.

In element 652, a coordinator node accesses namespace for files. For example, coordinator node 102 can access namespace 112 for files 110. As noted, coordinator node can use namespace information that is a local copy of namespace 112 and that corresponds to at portion of namespace 112.

In element 654, the coordinator node divides namespace into multiple sets. For example, coordinator node 102 can divide the namespace (or the local namespace information) into multiple sets. The coordinator node can base the dividing based on file attributes of the files of the subset.

In element 656, the coordinator node can create multiple streams corresponding to the sets. In one embodiment, the coordinator node can communicate with the storage subsystem to make determine the number of streams that need to and/or can be created. For example, the number of streams to be created can depend on the type and speed of data storage, the number of nodes available in the storage subsystem, connection speed between the nodes and the data storage and/or data cluster, local (e.g., cache memory) storage on each node in the storage subsystem, and/or number of other tasks that are performed by the nodes in the storage subsystem, among others. It is noted that element 656 is optional.

In element 658, a group of files of the subset of files in the data cluster is accessed using the node(s) of the storage subsystem. The nodes can access the first group of files of the subset using the streams. For example, if the storage subsystem has many resources available for back-up, the coordinator node can communicate with the nodes (e.g., such as by directing the nodes) to access data for a first group of the files (i.e., corresponding to a first group of sets). In element 660, a group of files are stored using the node(s). The node(s) can store the first group of files that are accessed in element 608.

FIGS. 7A and 7B are block diagrams 700A and 700B of data storage, according to one embodiment. Data storage 702A and 702B are both illustrations of data storage. Data storage 702A of FIG. 7A includes multiple containers 704A(1)-704A(N). Data storage 702A is an example representation of data storage 116 of FIG. 1. With reference to FIG. 5A, various data storage devices 506(1)-506(N) can include containers of data storage 702A. With reference to FIG. 5B, cloud storage 508 can include containers of data storage 702A. In one embodiment, each of containers 704A(1)-704A(N) is of substantially the same size. This size is typically fixed, but also may be dynamically adjusted, based on factors such as various attributes and/or type of the data storage. In one embodiment, each container is configured to store one set of files, such as that created by the coordinator node in element 604 (and/or element 654). In one embodiment, the coordinator node performs the division of the namespace based on the size and/or availability of the containers. Benefits of dividing the namespace based on the containers include efficient restoration, such that related files that are being restored are stored in the same container (e.g., files F1-F3).

Data storage 702B of FIG. 7A includes multiple containers depicted in FIG. 7, for the sake of simplicity, as containers 704B(1) and 704B(2). Data storage 702B is a representation of data storage 116 of FIG. 1. In one embodiment, containers 704B(1) and 704B(2) can be implementations of the containers shown in FIG. 7A. As shown, container 704B(1) stores files F1-F3 706(1)-706(3), and container 704B(2) stores files F4-F6 706(4)-706(6).

In one embodiment, with reference to FIG. 6A, files F1-F3 can be stored as a first set by a first node (e.g., using a first stream). In parallel, files F4-F6 can be stored as a second set by a second node (e.g., using a second stream). In another embodiment, with reference to FIG. 6B, files F1-F3 can be stored as a first set by a first node. Files F4-F6 can be stored as a second set by either a second node, or by the same first node after the first node completes the storing of files F1-F3. In either embodiment, each container includes used space (i.e., space used for storing files) and unused space, i.e., unused space 708(1) and 708(2). This unused space can be used for making incremental backups, such as backups that do not require a recalculation of sets.

Figure 8:
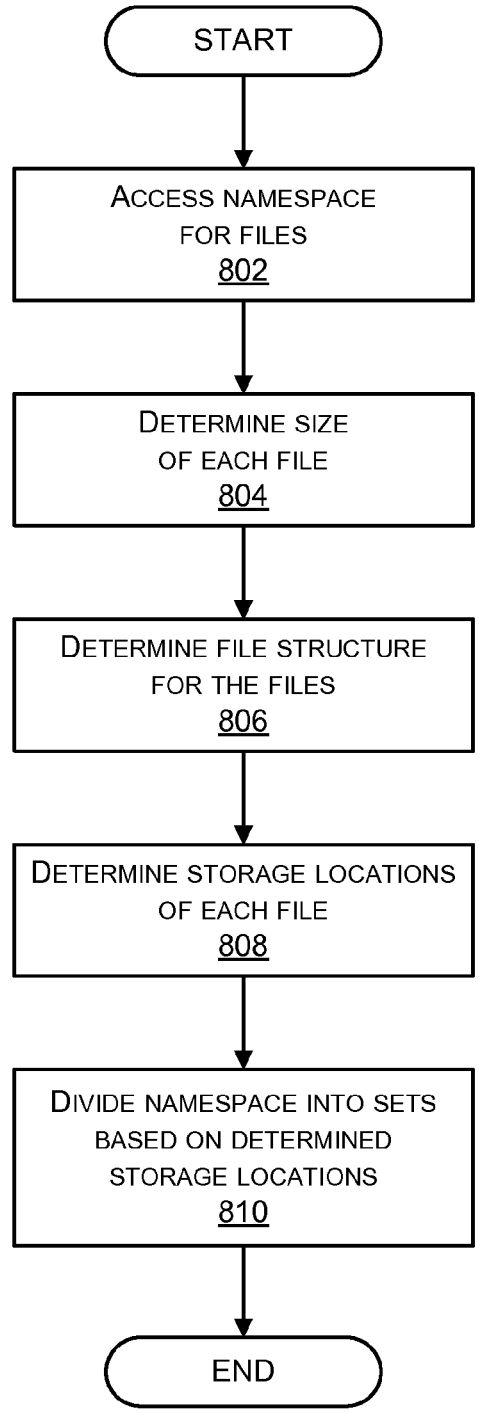
FIG. 8 is a flowchart illustrating a method for dividing a file namespace into sets, according to one embodiment.

FIG. 8 is a flowchart illustrating a method 800 for dividing a file namespace into sets, according to one embodiment. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 800 is described with reference to variations of the elements described in connection with FIG. 1.

In element 802, a namespace is accessed. For example, coordinator node 102 can access namespace 112 for files 110. As noted, coordinator node can use namespace information that is a local copy of namespace 112 and that corresponds to at portion of namespace 112. The coordinator node can also access a portion of the namespace.

In element 804, size of each file of the subset is determined. For example, coordinator node 102 (and/or nodes in the data cluster) can determine the size of each file in the data cluster that is to be backed-up. The coordinator node can determine the size of each file corresponding to the portion of the namespace accessed in element 802.

In element 806, the file structure of the files in the portion of the namespace is determined. In one implementation, coordinator node 102 (and/or nodes in the data cluster) can determine the file structure (and also additional metadata) of these files. In one implementation, the coordinator node and/or nodes in the data cluster can monitor and create any needed file structure and/or metadata for the portion of the namespace.

In element 808, the storage locations of each file corresponding to the portion of the namespace is determined. In one embodiment, the determination of the storage location is also based on determining containers (i.e., in the storage subsystem) where the files are to be stored. This determination can be based on a variety of factors, as described below. In element 810, the portion of the namespace is divided into sets based on the determined storage locations. It is noted that elements 808 and 810 can be performed substantially at the same time.

Figure 9:
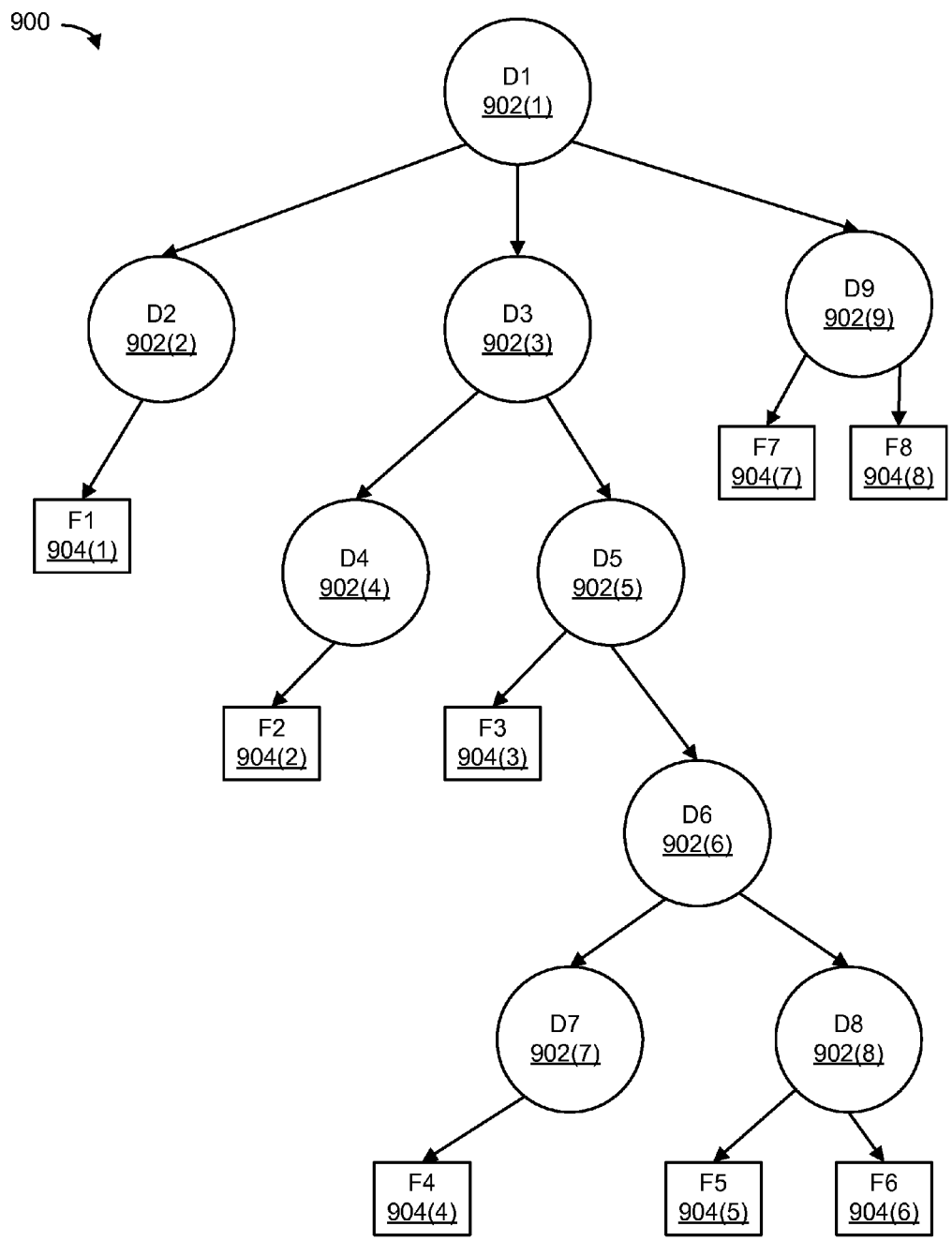
FIG. 9 is a diagram illustrating example representations of a file system that can be backed-up, according to some embodiments.

FIG. 9 is a diagram illustrating example representations of a file system that can be backed-up, according to some embodiments. Diagram 900 shows an example tree 900 illustrating a file system. Tree 900 includes directory nodes D1-D9 (elements 902(1)-902(9)) and file nodes F1-F8 (elements 904(1)-904(8)). Directory nodes can be used to represent file structure of files in the data cluster. File nodes can be used to represent files of the data cluster. The file structure shown here can be determined by element 806 and can be performed for files F1-F6 that correspond to a portion of the namespace accessed by element 802.

In one embodiment, the file system can be enumerated (e.g., a process that includes elements 804 and 806). This enumeration can determine tree 900. Next, portions of tree 900 can be divided into sets. Each set can correspond to a container. This division can be performed such that related files are placed in the same set (and thus can be stored in the same container). For example, in accordance with the above examples, files F1-F3 can be selected into a first set, and files F4-F6 can be selected into a second set. This example assumes that the size of the files in the first set is below a threshold size needed for future incremental backup (i.e., unused space 708(1)); similar determination can be made for the second set with regard to unused space 708(2). Furthermore, files F7 and F8 can be selected into a third set.

In accordance with this embodiment, upon a change in files that correspond to the namespace portion (e.g., element 204), a determination can be made whether the sets should be recalculated, or can the existing sets be re-used for backing up the changed file(s). For example, the unused space can be used to store additional file(s) (or the same file if it became larger), as long as the unused space does not decrease below a certain threshold. Similarly, if the existing sets cannot be used to store additional file(s), or if storing the changed file using the same container would decrease the unused space below this certain threshold, the sets should be recalculated. During such a recalculation, additional container(s) can be added, as needed. Similarly, if file(s) are deleted that correspond to the portion of namespace to be backed up, or such a file has decreased in size, the remaining files can continue to be backed up using existing containers. In one embodiment, one or more containers can be deleted from a set of containers being used, such as to optimize the use of containers. In one embodiment, only a subtree (i.e., a portion of the tree) is recalculated upon such a change. For example, if a file is added, and such a change requires an additional container, the remaining containers are not affected. In a related example, if a file already being backed-up increases in size, only the subtree (and corresponding container(s)) containing that changed file is affected, the remaining containers are not affected.

Figure 10:
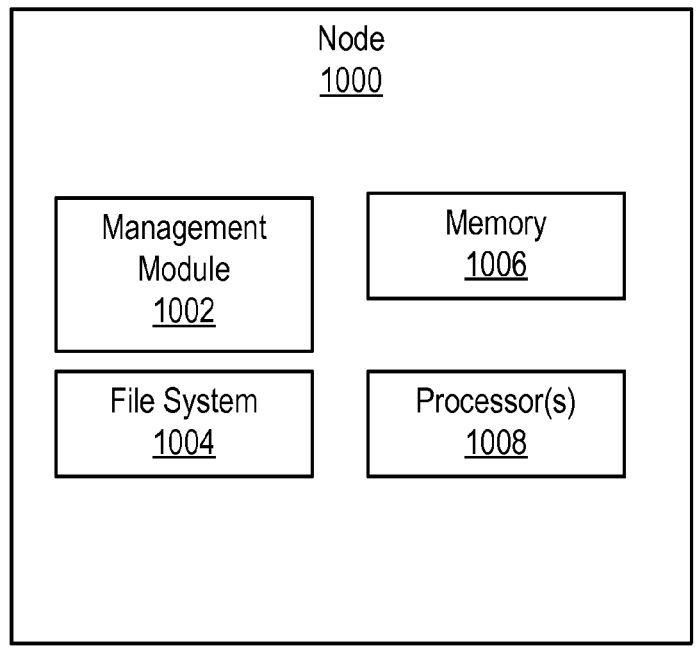
FIG. 10 is a block diagram illustrating various components of a node, according to one embodiment.

FIG. 10 is a block diagram of a node 1000, such as node 102, 114(1)-114(N), and/or nodes 402(1)-402(N), as described in FIGS. 1 and 4. Node 1000 includes a management module 1002, a file system 1006, memory 1006, and/or one or more processor(s) 1008. It is noted that is some embodiments, one or more of these elements may be combined. For example, memory 1006 may include one or more of management module 1002, and/or file system 1004. It is also noted that management module 1002 may be implemented as a software and/or hardware module. It is also noted that in some embodiments one or more of elements of node 1000 may not be used. Processor(s) 1008 can execute one or more of management module 1002, and/or file system 1004. Management module 1002 can implement at least portions of methods 600A and/or 600B.

Figure 11:
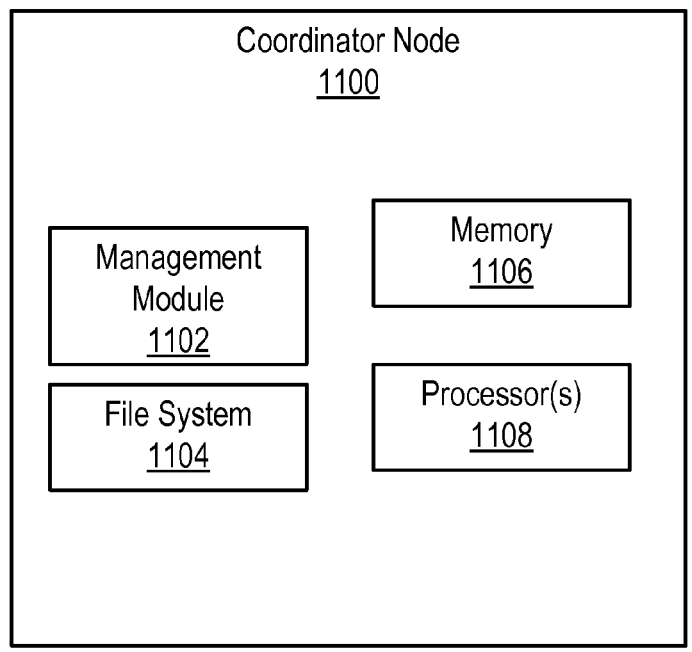
FIG. 11 is a block diagram illustrating various components of a coordinator node, according to one embodiment.

FIG. 11 is a block diagram of a coordinator node 1100, such as coordinator node 104 described in FIG. 1. Coordinator node 1100 includes a management module 1102, a file system 1106, memory 1106, and/or one or more processor(s) 1108. It is noted that is some embodiments, one or more of these elements may be combined. For example, memory 1106 may include one or more of management module 1102, and/or file system 1104. It is also noted that management module 1102 may be implemented as a software and/or hardware module. It is also noted that in some embodiments one or more of elements of coordinator node 1100 may not be used. Processor(s) 1108 can execute one or more of management module 1102, and/or file system 1104. Management module 1102 can implement at least portions of methods 200, 600A, 600B, and/or 800.

Figure 12:
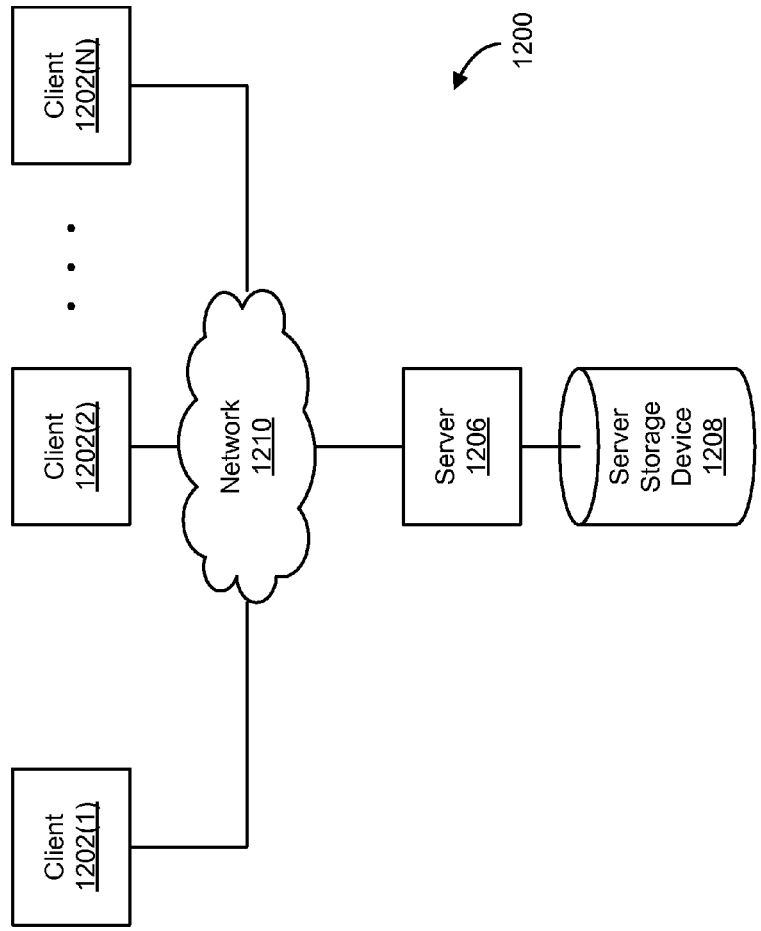
FIG. 12 is a block diagram illustrating a network architecture in which embodiments of the present application can be implemented.

Elements of network architecture can be implemented using different computer systems and networks. An example of one such network environment is described below with reference to FIG. 12. FIG. 12 is a simplified block diagram illustrating a network architecture 1200 in which one or more clients are provided with access to a server via various network connections. As depicted in FIG. 12, clients 1202(1)-(N) are coupled to a network 1210, and so are able to access a server 1206 (which can be used to implement node(s) of FIGS. 1, 3, and/or 4) via network 1210. Other servers (not shown) can be used instead to implement system(s) node(s) of FIGS. 1, 3, and/or 4). A client can be implemented using, for example, a desktop computer, a laptop computer, a workstation, a server, a cell phone, a smart phone, a network-enabled personal digital assistant (PDA), or the like. An example of network 1210, which can be used by clients 1202(1)-(N) to access server 1206, is the Internet. Alternatively, access to server 1206 can be provided by a local area network (LAN) utilizing Ethernet, IEEE 802.11x, or some other communications protocol. As will be appreciated, server 1206 can be accessed by clients coupled directly thereto (not shown).

As also depicted on FIG. 12, server 1206 is coupled to a server storage device 1208, which includes a data volume such as storage 116 and/or storage 404, among others. Server storage device 1208 can be implemented as a single storage device or a collection of storage devices. Server storage device 1208 can also be implemented as a storage area network, which couples remote storage devices to a server (e.g., server 1206), such that the remote storage devices appear as locally-attached storage devices to the server's OS, for example.

In light of the present disclosure, those of skill in the art will appreciate that server storage device 1208 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1200 can include other components such as routers, firewalls and the like that are not germane to the discussion of the present network and will not be discussed further herein. Those of skill in the art will also appreciate that other configurations are possible. For example, clients 1202(1)-(N) can be directly coupled to server storage device 1208 without the user of a server or Internet; server 1206 can be used to implement both the clients and the server; network architecture 1200 can be implemented without the use of clients 1202(1)-(N); and so on.

As an example implementation of network architecture 1200, server 1206, services requests to data generated by clients 1202(1)-(N) to data stored in server storage device 1208. Any of the functionality of the nodes, agents, and/or administration modules can be implemented using one of the other servers in the manner illustrated by FIGS. 1, 3, and/or 4.

Figure 13:
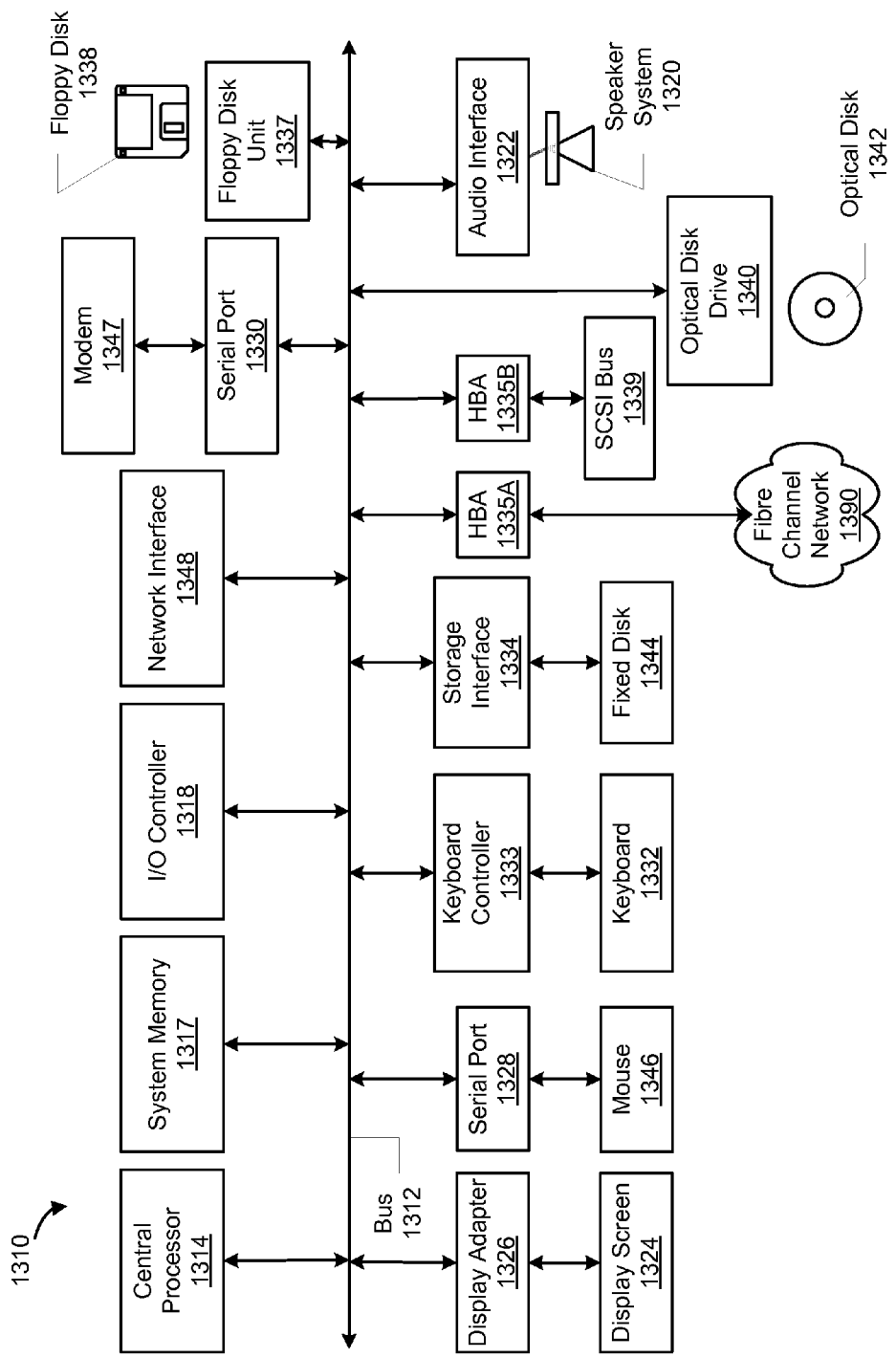
FIG. 13 is a block diagram that illustrates an example of a computer system suitable for implementing embodiments of the present application.

FIG. 13 depicts a block diagram of a computer system 1310 suitable for implementing the present disclosure. Computer system 1310 may be illustrative of various computer systems in the networked system of FIG. 1, such as node(s) and/or coordinator node(s), among others. Computer system 1310 includes a bus 1312 which interconnects major subsystems of computer system 1310, such as a central processor 1314, a system memory 1317 (typically RAM, but which may also include ROM, flash RAM, or the like), an input/output controller 1318, an external audio device, such as a speaker system 1320 via an audio output interface 1322, an external device, such as a display screen 1324 via display adapter 1326, serial ports 1328 and 1330, a keyboard 1332 (interfaced with a keyboard controller 1333), a storage interface 1334, a floppy disk drive 1337 operative to receive a floppy disk 1338, a host bus adapter (HBA) interface card 1335A operative to connect with a Fibre Channel network 1390, a host bus adapter (HBA) interface card 1335B operative to connect to a SCSI bus 1339, and an optical disk drive 1340 operative to receive an optical disk 1342. Also included are a mouse 1346 (or other point-and-click device, coupled to bus 1312 via serial port 1328), a modem 1347 (coupled to bus 1312 via serial port 1330), and a network interface 1348 (coupled directly to bus 1312).

Bus 1312 allows data communication between central processor 1314 and system memory 1317, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1310 are generally stored on and accessed via a computer readable medium, such as a hard disk drive (e.g., fixed disk 1344), an optical drive (e.g., optical drive 1340), a floppy disk unit 1337, or other storage medium. Additionally, applications can be in the form of electronic signals modulated in accordance with the application and data communication technology when accessed via network modem 1347 or interface 1348.

Storage interface 1334, as with the other storage interfaces of computer system 1310, can connect to a standard computer readable medium for storage and/or retrieval of information, such as a fixed disk drive 1344. Fixed disk drive 1344 may be a part of computer system 1310 or may be separate and accessed through other interface systems. Modem 1347 may provide a direct connection to a remote server via a telephone link or to the Internet via an internet service provider (ISP). Network interface 1348 may provide a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 13 need not be present to practice the present disclosure. The devices and subsystems can be interconnected in different ways from that shown in FIG. 13. The operation of a computer system such as that shown in FIG. 13 is readily known in the art and is not discussed in detail in this application. Code for using multiple clients for data backup and/or for using storage location to divide namespace for data backup (such as described above with reference to the methods of FIGS. 2, 6A, 6B, and/or 8), etc., to implement the present disclosure can be stored in computer-readable storage media such as one or more of system memory 1317, fixed disk 1344, optical disk 1342, or floppy disk 1338. Memory 1320 is also used for storing temporary variables or other intermediate information during the execution of instructions by the processor 1310. The operating system provided on computer system 1310 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   accessing a portion of a namespace, wherein
      the namespace indicates locations of a plurality of files;
   determining size of each file corresponding to the portion of the namespace;
   determining file structure of files corresponding to the portion;
   determining a storing location of the each file, wherein
      the determining the storing location is based on one or more of the size of the each file, or
         the file structure of files corresponding to the portion; and
   based on a determination of the storing location, dividing, using at least one processor, at least a portion of the namespace into a plurality of sets, wherein
      the plurality of sets corresponds to a subset of the plurality of files.

2. The method of claim 1, wherein
   each of the sets is configured to be stored in a container of a plurality of containers, and
   the determining the storing location comprises determining one of the plurality of containers where the each file is to be stored.

3. The method of claim 2, wherein
   each of the plurality of containers is configured to store a substantially similar amount of data,
   each of the plurality of containers comprises used space and unused space, and
   the determining the storing location is further based on an amount of unused space of the each of the containers.

4. The method of claim 3, wherein
   the determining the location comprises reserving a portion of the unused space in each of the plurality of containers.

5. The method of claim 2, further comprising:
   determining that a size of a first portion of the subset has increased, wherein the first portion of the subset corresponds to one of the sets; and
   in response to a determination that the size of the first portion of the subset has increased, determining whether to
      continue using a first of the plurality of containers to store the first portion of the subset, wherein
         the first container stores the first portion of the subset prior to the determination that the size of the first portion of the subset has increased, or
      add a new container to the plurality of containers to store the first portion of the subset.

6. The method of claim 5, wherein
   determining that the size of the first portion of the subset has increased comprises one or more of
      determining that another file is added to the subset, or
      determining that a size of at least one of the files in the subset is increased.

7. The method of claim 2, further comprising:
   determining that a size of a first portion of the subset has decreased, wherein the first portion of the subset corresponds to one of the sets; and
   in response to a determination that the size of the first portion of the subset has decreased, determining whether to
      continue using a first of the plurality of containers to store the first portion of the subset, wherein
         the first container stores the first portion of the subset prior to the determination that the size of the first portion of the subset has decreased, or
      store the first portion of the subset in a second of the plurality of containers.

8. The method of claim 7, wherein
   determining that the size of the first portion of the subset has decreased comprises one or more of
      determining that a file is deleted from the subset, or
      determining that a size of at least one of the files in the subset is decreased.

9. The method of claim 1, wherein
   the determining the location is further based on locality of the files of the subset.

10. The method of claim 1, wherein
   at least one of the accessing, the determining the size, the determining the file structure, the determining the storing location, or dividing is performed prior to receiving a command for replicating the subset of the plurality of files.

11. A system comprising:
one or more processors;
a data cluster, comprising
  a plurality of files,
  a namespace, wherein
    the namespace indicates locations of the plurality of files;
a coordinator module, wherein
  the coordinator module is configured to
    determine size of each file of a subset of the plurality of files,
    determine file structure of the subset,
    determine a storing location of the each file, wherein
    the determination of the storing location is based on one or more of
      the size of the each file, or
      the file structure of the subset, and
    based on determination of the storing location, divide at least a portion of the namespace into a plurality of sets, wherein
      the plurality of sets corresponds to the subset of the plurality of files, and
    the coordinator module is configured to be executed using the one or more processors; and
data storage, wherein
  the subset of the plurality of files is stored at the data storage.

12. The system of claim 11, wherein
the coordinator module is configured to store each of the sets in a container of a plurality of containers,
the coordinator module is further configured to determine one of the plurality of containers where the each file is to be stored, and
the data storage comprises the plurality of containers.

13. The system of claim 11, wherein
each of the plurality of containers is configured to store a substantially similar amount of data,
each of the plurality of containers comprises used space and unused space, and
the coordinator module is further configured to
  perform the determination of the storing location further based on an amount of unused space of the each of the containers.

14. The system of claim 13, wherein
the coordinator module is further configured to determine that a size of a first portion of the subset has increased, wherein
  the first portion of the subset corresponds to one of the sets, and
in response to the determination that the size of the first portion of the subset has increased, the coordinator module is further configured to
  continue using a first of the plurality of containers to store the first portion of the subset, wherein
    the first container stores the first portion of the subset prior to the determination that the size of the first portion of the subset has increased, or
  add a new container to the plurality of containers to store the first portion of the subset.

15. The system of claim 13, wherein the coordinator module is further configured to:
determine that a size of a first portion of the subset has decreased, wherein
  the first portion of the subset corresponds to one of the sets, and
in response to the determination that the size of the first portion of the subset has decreased, the coordinator module is further configured to
  continue using a first of the plurality of containers to store the first portion of the subset, wherein
the first container stores the first portion of the subset prior to the determination that the size of the first portion of the subset has decreased, or
store the first portion of the subset in a second of the plurality of containers.

16. A computer program product comprising:
a plurality of instructions, comprising
  a first set of instructions, executable on a computer system, configured to access a portion of a namespace, wherein
    the namespace indicates locations of a plurality of files,
  a second set of instructions, executable on the computer system, configured to determine size of each file corresponding to the portion of the namespace,
  a third set of instructions, executable on the computer system, configured to determine file structure of files corresponding to the portion,
  a fourth set of instructions, executable on the computer system, configured to determine a storing location of the each file, wherein
    the determining the storing location is based on one or more of the size of the each file, or
    the file structure of files corresponding to the portion, and
  a fifth set of instructions, executable on the computer system, configured to, based on determination of the storing location, divide at least a portion of the namespace into a plurality of sets, wherein
    the plurality of sets corresponds to a subset of the plurality of files; and
a computer-readable storage medium, wherein the instructions are encoded in the computer-readable storage medium.

17. The computer program product of claim 16, wherein
each of the sets is configured to be stored in a container of a plurality of containers, and
the determining the storing location comprises determining one of the plurality of containers where the each file is to be stored.

18. The computer program product of claim 17, wherein the instructions further comprise:
a sixth set of instructions, executable on the computer system, configured to determine that a size of a first portion of the subset has increased, wherein the first portion of the subset corresponds to one of the sets, and
a seventh set of instructions, executable on the computer system, configured to, in response to the determination that the size of the first portion of the subset has increased, determine whether to
  continue using a first of the plurality of containers to store the first portion of the subset, wherein
    the first container stores the first portion of the subset prior to the determination that the size of the first portion of the subset has increased, or
  add a new container to the plurality of containers to store the first portion of the subset.

19. The computer program product of claim 17, wherein the instructions further comprise:
a sixth set of instructions, executable on the computer system, configured to determine that a size of a first portion of the subset has decreased, wherein the first portion of the subset corresponds to one of the sets, and a seventh set of instructions, executable on the computer system, configured to, in response to the determination that the size of the first portion of the subset has decreased, determine whether to
- continue using a first of the plurality of containers to store the first portion of the subset, wherein
  - the first container stores the first portion of the subset prior to the determination that the size of the first portion of the subset has decreased, or
- store the first portion of the subset in a second of the plurality of containers.

20. The computer program product of claim 16, wherein each of the plurality of containers is configured to store a substantially similar amount of data, each of the plurality of containers comprises used space and unused space, and the determining the storing location is further based on an amount of unused space of the each of the containers.

\* \* \* \* \*